(No Model.)
A. I. OSBORN.
FENCE.
No. 284,656. Patented Sept. 11, 1883.
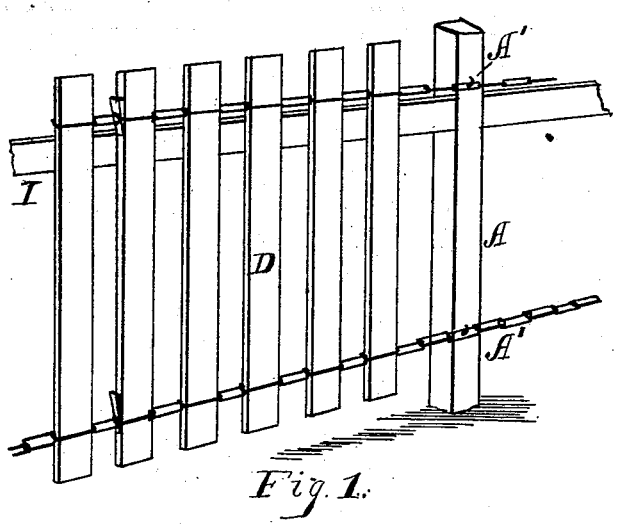
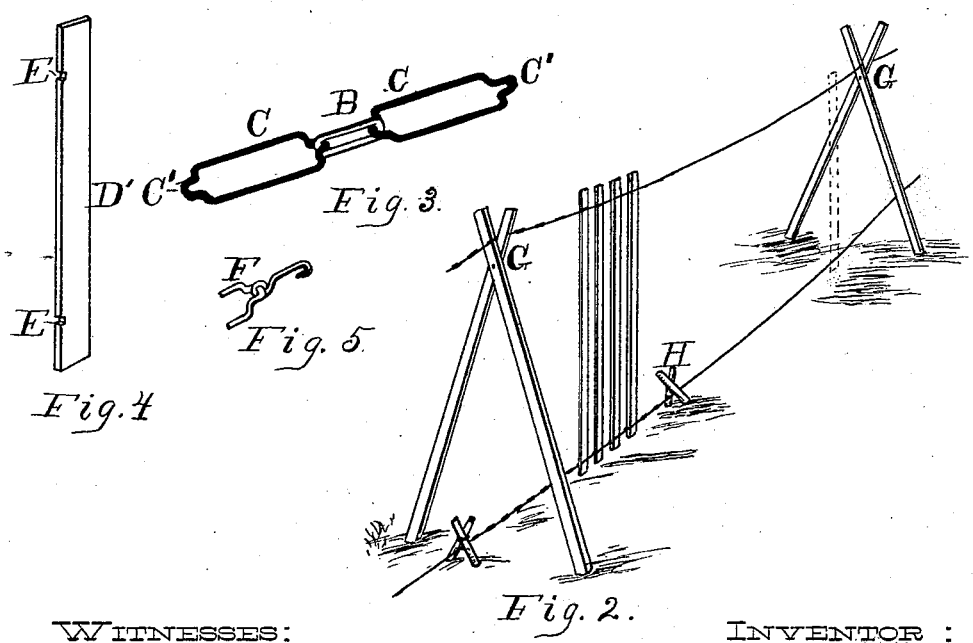
WITNESSES:
Alice Brennan
Clara Sugenheim
INVENTOR:
Albert Ira Osborn.
By J. L. Zerbe
Attorney.

UNITED STATES PATENT OFFICE.

ALBERT IRA OSBORN, OF NEW POINT, INDIANA.

FENCE.

SPECIFICATION forming part of Letters Patent No. 284,656, dated September 11, 1883.

Application filed March 26, 1883. (No model.)

*To all whom it may concern:*

Be it known that I, ALBERT IRA OSBORN, of New Point, in the county of Decatur and State of Indiana, have invented a new and useful Improvement in Fences, which improvement is fully set forth in the following specification and accompanying drawings, in which—

Figure 1 is a perspective view of my improved fence. Fig. 2 is a portable form of the same. Fig. 3 is an enlarged view of links in the chain. Fig. 4 is a form of link-hook for making connection. Fig. 5 is a view of a notched paling.

The object of my invention is to provide a light portable fence that can easily be constructed, and, when desired, can be detached from the posts or other means of support, wound or rolled up, and transported to another position, or that can be stowed away for future use.

A are posts of sufficient size, planted firmly in the ground at regular intervals. Near the ground, and also at a short distance from the top of the post, shafts or hooks are driven into or securely fastened to the post. These staples or hooks can be made of any suitable material, (of wrought-iron, preferably,) so that they may be turned back or clinched, if necessary.

The alternate links B are simply constructed in the ordinary form and of proper length to measure the distance between the palings or vertical pieces of the fence. The other alternate links are made of the proper size and shape to receive the vertical pieces or palings D, and these links are provided with the loops C' at each end, so that the alternate links B may rest in them without coming in contact with the palings. These links may also be made round to receive poles, if necessary.

D are vertical pieces or palings to be placed in the alternate links C.

D' is a paling or vertical piece provided with notches E. These notched palings are to be placed at frequent intervals in the chain to keep the chains at a uniform distance apart. The link enters the notch while a wedge is driven between the end of the link and the paling.

F is a link with hook attached, to be used at the end of sections to connect them together.

G are forms of supports that can be used in place of posts where a temporary fence is required, consisting of two upright pieces crossing each other near the top, and secured together by means of a bolt-pin in the form of an X. On this fork the upper chain of the fence rests, while the chain next the ground may be secured in place by means of stakes H, driven over the chain, and a wire is employed around the two to hold them securely in place, and also to prevent the chain from drooping or sagging the fence. These stakes H also prevent hogs or other small animals from raising the fence or moving the same sidewise, thus keeping the whole firm and rigid, while at the same time it may be readily taken down, rolled up, and transported. If found necessary, posts may also be placed between the supports G, to make the fence more rigid.

It is designed to make this fence in sections as long as convenient, and to have the sections secured to each other by means of hooks, links, or otherwise.

To furnish greater rigidity to the sections between the posts, I prefer to place a horizontal board or strip, I, along the vertical paling, directly below the upper chain. This board can be attached to each paling by means of wire, or to the alternate paling or palings, and will be of great service in strengthening the fence when lateral pressure is exerted.

What I claim as new is—

1. The combination of the chain B C, having the palings D, with the horizontal stay-board I, substantially as herein set forth.

2. The combination of the chain B C, having the paling D and the stay-board I, with the staying or securing stakes H, substantially as herein set forth.

In testimony that I claim the foregoing I have hereunto set my hand, this 17th day of March, 1883, in the presence of witnesses.

ALBERT IRA OSBORN.

Witnesses:
C. D. ZERBE,
WM. HARTLEY PUGH.